(12) United States Patent
Gibson

(10) Patent No.: US 10,425,777 B2
(45) Date of Patent: Sep. 24, 2019

(54) BEVERAGE CONTAINER AUGMENTATION FOR SOCIAL MEDIA

(71) Applicant: Xerox Corporation, Norwalk, CT (US)

(72) Inventor: George A. Gibson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 906 days.

(21) Appl. No.: 14/824,544

(22) Filed: Aug. 12, 2015

(65) Prior Publication Data

US 2017/0046546 A1    Feb. 16, 2017

(51) Int. Cl.
*G06Q 30/02* (2012.01)
*H04W 4/12* (2009.01)
*G06Q 50/00* (2012.01)

(52) U.S. Cl.
CPC .......... *H04W 4/12* (2013.01); *G06Q 30/0261* (2013.01); *G06Q 30/0267* (2013.01); *G06Q 30/0269* (2013.01); *G06Q 50/01* (2013.01)

(58) Field of Classification Search
USPC .......................................................... 705/14
See application file for complete search history.

(56) References Cited

U.S. PATENT DOCUMENTS

| | | | |
|---|---|---|---|
| 7,336,186 B2 | 2/2008 | Noguchi | |
| 8,261,972 B2 | 9/2012 | Ziegler | |
| 2002/0137502 A1* | 9/2002 | Cronin | G06F 8/65 455/419 |
| 2006/0219858 A1* | 10/2006 | Iacovino | A47G 23/02 248/311.2 |
| 2008/0289235 A1* | 11/2008 | Free | G06Q 30/0273 40/567 |
| 2009/0014536 A1* | 1/2009 | Gelbman | G06F 3/1454 235/492 |
| 2009/0145966 A1* | 6/2009 | Silverbrook | G06F 3/014 235/383 |
| 2009/0274278 A1* | 11/2009 | Haldeman | G06Q 10/107 379/88.13 |
| 2011/0055030 A1 | 3/2011 | Nicolas et al. | |
| 2012/0123673 A1 | 5/2012 | Perks et al. | |
| 2012/0244885 A1* | 9/2012 | Hefetz | G06O 20/32 455/456.2 |
| 2013/0059534 A1 | 3/2013 | Sobalvarro et al. | |

(Continued)

*Primary Examiner* — David J Stoltenberg
*Assistant Examiner* — Gautam Ubale
(74) *Attorney, Agent, or Firm* — Fox Rothschild LLP

(57) ABSTRACT

A system for communicating a message in response to placement of a product within a receptacle configured to receive a packaged product, the receptacle comprising a sensor configured to extract information from a token printed on the packaged product when the token is in a range of the sensor, and a wireless transmitter. The system may also include a mobile electronic device comprising a processor, a computer-readable memory, a wireless receiver operable to detect a signal emitted by the wireless transmitter of the receptacle, a transmitter. The mobile device may also include programming instructions comprising an installed application configured to cause the processor to detect the signal, analyze the signal and extract the information from the signal, retrieve user information for a user associated with the installed application, generate a message corresponding to the extracted information, and cause the transmitter of the mobile electronic device to send the message.

18 Claims, 5 Drawing Sheets

(56) References Cited

U.S. PATENT DOCUMENTS

| | | | |
|---|---|---|---|
| 2013/0096715 A1* | 4/2013 | Chung | G06Q 20/32 700/233 |
| 2013/0097002 A1* | 4/2013 | Dishneau | G06Q 30/02 705/14.25 |
| 2013/0304553 A1 | 11/2013 | Hertel et al. | |
| 2015/0095168 A1 | 4/2015 | Zises et al. | |
| 2015/0317698 A1* | 11/2015 | Kalyvas | G06Q 30/0277 705/14.16 |
| 2016/0071115 A1* | 3/2016 | Oh | G06Q 20/202 705/7.29 |
| 2016/0099753 A1* | 4/2016 | Murray | H04B 5/0062 455/41.1 |

* cited by examiner

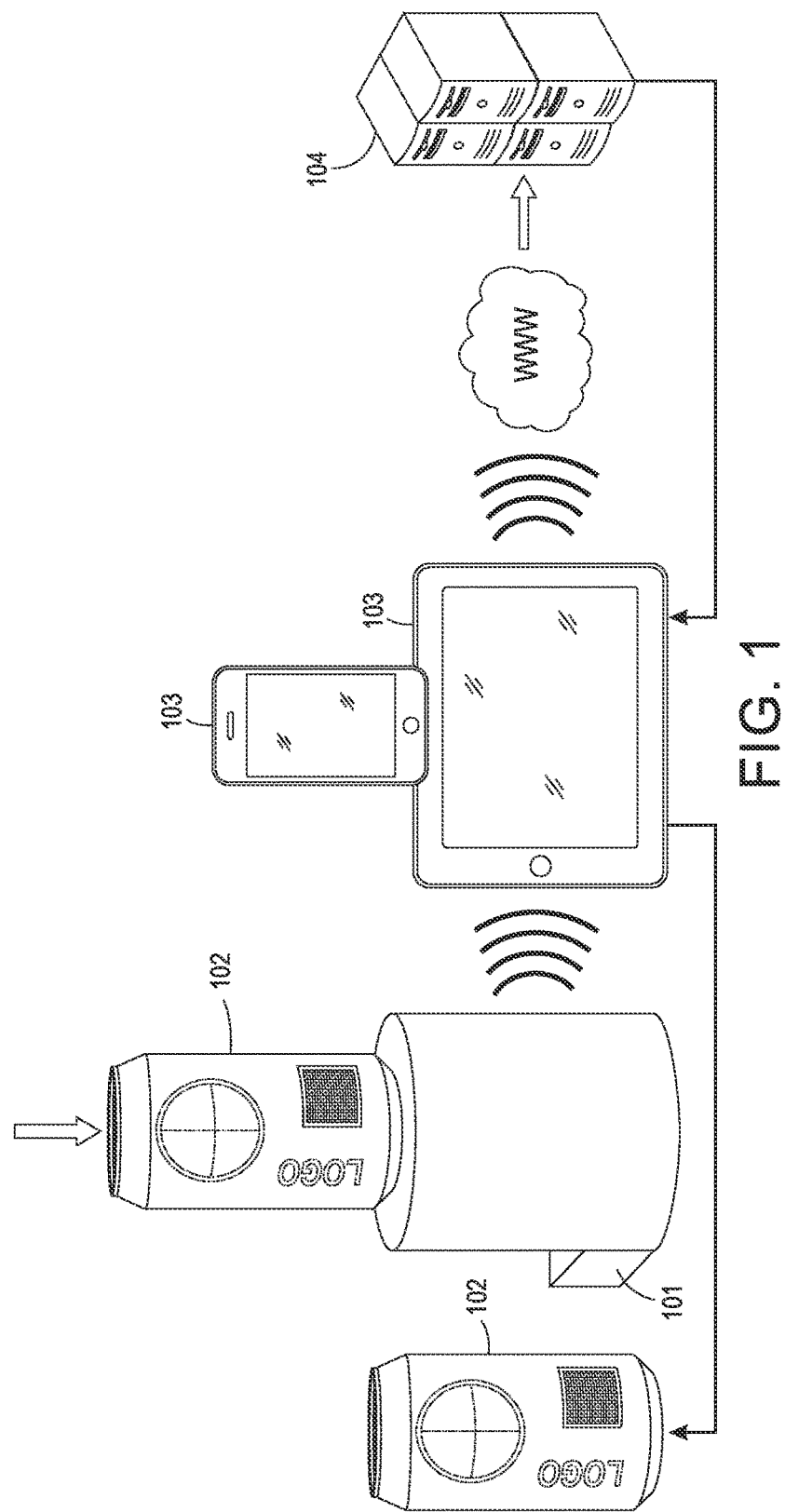

BEVERAGE CONTAINER AUGMENTATION FOR SOCIAL MEDIA

BACKGROUND

Distinguishing consumer products, such as beverages, from those of competitors in an attractive and interesting manner increases sales and consumption of the product. In creating consumer products, the product containers may be customized to appeal to a target market, while maintaining economic viability of the product. However, current printed labels contain static information only, limited to promotion of company brand, communicating limited information to customers such as product collection name, color style, size. Some product containers may also include a bar code with limited identifying information that is primarily scanned by cashiers.

However, the information printed on the product label may not include all of the desired information a consumer requires and typically cannot be changed easily, for example to target a specific type of consumer or reflect a change in the product, such as a change in price or other promotion. In order to make a change, the entire message has to be replaced, or over labeled with the new message, that is concealing the underlying message by applying a label over the message with the new indicia.

With the emergence of the internet of things it is desirable to create a product container and/or packaging label that can be connected to a network, is easily customizable, can provide customers with unlimited amount of related information both before and after purchase, and is cost effective to deploy at the individual container level.

The current disclosure discloses a product packaging label and/or product container that addresses the above limitations, and methods for manufacturing the same.

SUMMARY

In an embodiment, a system (and/or method) for communicating a message in response to placement of a product within a receptacle is disclosed. The system may include a receptacle configured to receive a packaged product, and a mobile electronic device. The receptacle may include a sensor configured to extract information from a token that is printed on the packaged product when the token is in a range of the sensor, and a wireless transmitter. The mobile electronic device may include a processor, a computer-readable memory, a wireless receiver that is operable to detect a signal emitted by the wireless transmitter of the receptacle, a transmitter, and programming instructions comprising an installed application. The programming instructions may be configured to cause the processor to detect the signal, analyze the signal and extract the information from the signal, retrieve user information for a user who is associated with the installed application, generate a message that corresponds to the extracted information, and cause the transmitter of the mobile electronic device to send the message via a wireless communication protocol. In at least one embodiment, the mobile electronic device may also include a geographic location sensor, and the instructions to generate the message also may also include instructions to cause the processor to include a geographic location information detected by the geographic location sensor for a time at which the electronic device detected the signal from the receptacle in the message.

In certain embodiments, the receptacle may include a beverage holder, the product package may include a beverage container on which the token is applied, and the range of the sensor may include an interior of the receptacle so that the sensor reads the token when the beverage container is placed in the beverage holder.

In an embodiment, the instructions to generate the message that corresponds to the extracted information may include instructions to identify a marketing entity that is associated with the packaged product; and generate the message for the marketing entity so that the message includes an identifier of the packaged product and the user information. In yet another embodiment, the instructions to generate the message that corresponds to the extracted information may include instructions to identify a social media application that is installed in the mobile electronic device, and generate the message as an instruction that will cause the social media application to post a communication to a social media account that is associated with the user, wherein the posted communication includes an identifier of the packaged product.

Alternatively and/or additionally, the system may include additional instructions that are configured to cause the processor of the mobile electronic device to receive a marketing communication, in response to the sent message, and present the marketing communication to the user, on a display of the mobile electronic device. In an embodiment, the marketing communication may include a video that is associated with the packaged product.

In an embodiment, the receptacle may also include comprises a processor, a display, and a computer-readable memory, and the message may include a media file that is playable by the processor and the display of the receptacle. The computer-readable memory of the receptacle may include programming instructions that are configured to cause the processor and display of the receptacle to play the media file on the display upon receipt of the message from the mobile electronic device.

The system may also include additional instructions that are configured to cause the processor of the mobile electronic device to: identify an initial time at which the signal is detected; use the initial time to calculate a future time at which to present a future purchase reminder for the packaged product to the user; and at the future time, cause a display of the mobile electronic device to present the future purchase reminder to the user.

In another aspect, a system (an/or method) for communicating a message in response to placement of a product proximate to a mobile electronic device is disclosed. The system may include a product package comprising a token that includes a power source and a wireless transmitter, and a mobile electronic device. The mobile electronic device may include a processor, a computer-readable memory, a wireless receiver that is operable to detect a signal emitted by the wireless transmitter of the product package, a transmitter, and programming instructions comprising an installed application. The programming instruction may be configured to cause the processor to: detect the signal, analyze the signal and extract token information from the signal, retrieve user information for a user who is associated with the installed application, identify a message that corresponds to the code, and cause the transmitter of the mobile electronic device to send the message via a wireless communication protocol.

In certain embodiment, the instructions to generate the message that corresponds to the extracted information may also include instructions to identify a marketing entity that is associated with the packaged product, and generate the message for the marketing entity so that the message includes an identifier of the packaged product and the user information. Additionally and/or alternatively, the instructions to generate the message that corresponds to the extracted information may also include instructions to: identify a social media application that is installed in the mobile electronic device; and generate the message as an instruction that will cause the social media application to post a communication to a social media account that is associated with the user, wherein the posted communication includes an identifier of the packaged product.

In an embodiment, the mobile electronic device may also include a geographic location sensor, and the instructions to generate the message may include causing the message to include geographic location information detected by the geographic location sensor for a time at which the electronic device detected the signal from the receptacle.

In an embodiment, the receptacle may also include comprises a processor, a display, and a computer-readable memory, and the message may include a media file that is playable by the processor and the display of the receptacle. The computer-readable memory of the receptacle may include programming instructions that are configured to cause the processor and display of the receptacle to play the media file on the display upon receipt of the message from the mobile electronic device.

Alternatively and/or additionally, the system may include additional instructions that are configured to cause the processor of the mobile electronic device to receive a marketing communication, in response to the sent message, and present the marketing communication to the user, on a display of the mobile electronic device. In an embodiment, the marketing communication may include a video that is associated with the packaged product.

The system may also include additional instructions that are configured to cause the processor of the mobile electronic device to: identify an initial time at which the signal is detected; use the initial time to calculate a future time at which to present a future purchase reminder for the packaged product to the user; and at the future time, cause a display of the mobile electronic device to present the future purchase reminder to the user.

In another aspect, a system for communicating a message in response to placement of a product within a range of a sensor associated with an article is disclosed. The system may include an article configured to receive information from a packaged product. The article may include a sensor configured to extract information from a token that is printed on the packaged product when the token is in a range of the sensor, and a wireless transmitter. The system may also include a mobile electronic device comprising a processor, a computer-readable memory, a wireless receiver that is operable to detect a signal emitted by the wireless transmitter of the article, a transmitter, and programming instructions comprising an installed application. The programming instructions may be configured to cause the processor to: detect the signal, analyze the signal and extract the information from the signal, retrieve user information for a user who is associated with the installed application, generate a message that corresponds to the extracted information, and cause the transmitter of the mobile electronic device to send the message via a wireless communication protocol.

In yet another aspect, a method for communicating a message relating to a product package may include reading, using a sensor, information from a token printed on a product package; transmitting, using a wireless transmitter associated with the sensor, a signal comprising the extracted information; receiving, the transmitted signal at a mobile electronic device; analyzing, using a processor of the mobile electronic device, the received signal to extract the information; retrieving, using the processor, user information for a user associated with the mobile electronic device; generating, using the processor, a message that corresponds to the extracted information; and transmitting, using a wireless transmitter of the mobile electronic device, the message.

BRIEF DESCRIPTION OF THE DRAWINGS

FIG. 1 illustrates an example system for transmitting and receiving product information, according to an embodiment.

DETAILED DESCRIPTION

Figure 2A:
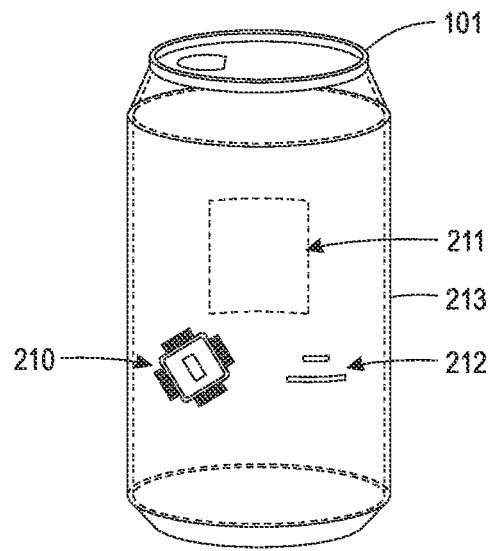
FIG. 2A illustrates an example line view of a receptacle for receiving a product container, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

The following terms shall have, for purposes of this application, the respective meanings set forth below:

A "product container" refers to a physical item for holding a product having an exterior portion on which a product packaging label may be applied. Example product containers may include, without limitation, food or beverage containers, bottles, cups, books, medicine containers, and/or the like.

A "product packaging label" refers to a flexible, thin label that is affixed or attached to, or is integral with, a product container and that includes, without limitation, product information.

A "mobile device" or "mobile electronic device" refers to a portable computing device that includes short range or near-field wireless communication interface such as an NFC, Bluetooth, or Bluetooth low energy interface, a processor and non-transitory, computer-readable memory. As used in this description, a "mobile device" or a "mobile electronic device" may be a single device, or any number of devices having one or more processors that communicate with each other and share data and/or instructions. Examples of mobile electronic devices include, without limitation, personal computers, servers, mainframes, gaming systems, televisions, and portable electronic devices such as smartphones, personal digital assistants, cameras, fitness tracking devices, tablet computers, laptop computers, media players and the like.

Near field communications (NFC) are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less, although it may be 20 cm or less, 4 cm or less, or other ranges. Near field communications can support two-way (sometimes including peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

As used herein, the term "communication tag" refers to a device capable of transmitting data, for example utilizing an NFC tag. Communication tags generally comprise a circuit or microchip (that may include storage and processing capability) and an antenna, and may refer to any of passive, active, or semi-active communication tags. The communication tag may be a static tag or a dynamic tag. While the current disclosure describes the embodiments using NFC technology, other communication protocols such as Bluetooth, iBeam, etc. are within the scope of this disclosure.

FIG. 1 shows an example system for transmitting and receiving product information, according to an embodiment. In an embodiment, the system may include a receptacle 101 configured to read information from a product container 102. The receptacle 101 may include transmitter/receiver components that are configured transmit the extracted information to a mobile electronic device 103, which may transmit and/or receive information over a network such as the internet to a marketing entity system 104. The mobile device 103 may also transmit information to the product container 102.

As shown in FIG. 2A, the receptacle 101 may include a communications tag, such as an NFC tag, 110 to enable near field communication with a variety of NFC enabled devices including NFC enabled mobile devices and other NFC tags. The NFC tag 210 may include information to be transmitted to other NFC enabled devices. Near field communications require close proximity (e.g., no more than a few inches, or in some cases no more than one or two feet) to establish a communications link, and hence the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to send and/or receive data from the tag. Near field communications offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, cause the mobile terminal to perform certain processing actions, such as launching of applications, navigating to a particular website, or downloading of a particular file.

In an embodiment, the receptacle 101 may also include a sensor 211 configured to read information from a product container placed inside the receptacle. For example, the sensor may be placed inside the receptacle. The type of sensor may be selected to correspond to the type of encoding used to embed the information on the product container. For example, an optical sensor may be used if the product container includes information in the form of 2 dimensional bar codes, QR codes, or the like. A laser sensor may be used if the product container includes information in the form of 3 dimensional bar codes. An NFC reader or a radio-frequency identification device may be used if the product container includes information in the form of an NFC tag. The above examples are provided by way of example only and other types of sensors are within the scope of this disclosure.

In an embodiment, the receptacle 101 may also include a battery 212 to provide power to the sensor 211 and/or the NFC tag 210.

In an embodiment, the receptacle 101, may further include a display 213, a processor, and a memory unit (not shown here).

In an embodiment, the receptacle may be a beverage cozy. It will be understood to those skilled in the art that while the current disclosure uses a receptacle as an example embodiment for an article for receiving and/or reading information from a product package, the article may take any shape, size and/or form without deviating from the principles of the disclosure.

Figure 2B:
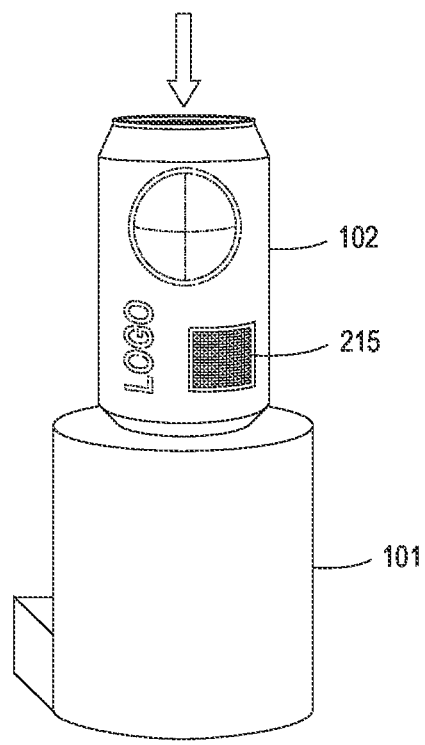
FIG. 2B illustrates an example embodiment of placing a product container in a receptacle of FIG. 2A, according to an embodiment.

As shown in FIG. 2B, the product container 102 may include a token comprising encoded information 215. The encoded information may include, without limitation, characters, glyphs, bar codes (1D, 2D or 3D), a universal product code, images, or other symbols. In an embodiment, the information may be directly printed on the product container. In another embodiment, the information may be printed on a product packing label affixed to the product container. The encoded information may include, without limitation, a unique product identification, manufacturer information, date of manufacture, quantity of product, URLs, ingredient information, price information, geospatial information, and the like.

In an embodiment, the product container 102 may be placed inside the receptacle such that the sensor 211 may extract the encoded information 215 (as is known to those skilled in the art) from the product container, and transmit the extracted information using the NFC tag 210.

In another aspect of the disclosure, the product container 102 and/or the product-packaging label 310 may itself include a communications tag 301 (including, without limitation, a printed antenna and a chip), as shown in FIG. 2A, printed using techniques known to those skilled in the art. Additionally and/or optionally, the product container 102 and/or the product-packaging label 310 may also include a printed battery 302, and a display 303. The communications tag 301 may be configured transmit stored information using the printed antenna, as shown in FIG. 2B.

In another embodiment, the product packaging label 310 may also include a sensor 304 (as discussed above with respect to FIG. 2A) configured to extract encoded information printed on the product container 102.

Figure 4:
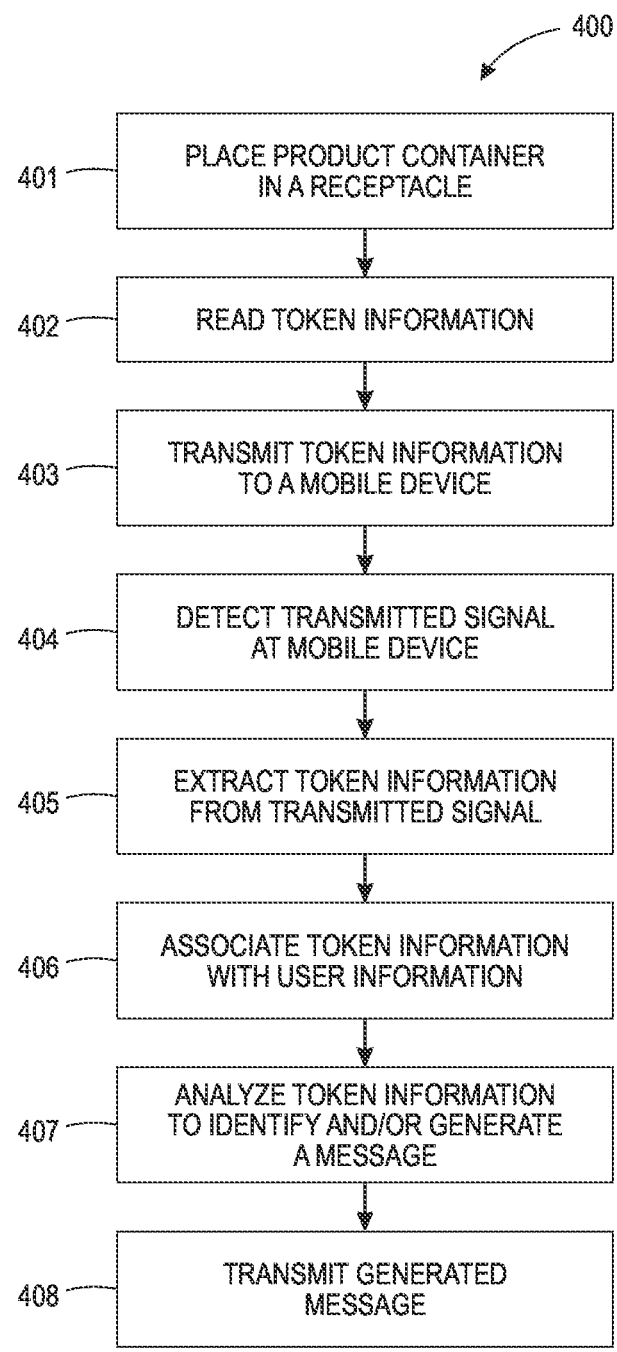
FIG. 4 illustrates a flow chart of an example of transmitting a message from a receptacle, via a mobile device, according to an embodiment.

Referring now to FIG. 4, an example method for transmitting information to and/or from a beverage container is described. In step 401, a user may place the product container inside the receptacle such that the receptacle sensor may extract and/or read 402 information from the token printed on the product container. In an embodiment, the receptacle may store the information.

The receptacle may transmit 403 the extracted information to a mobile device. In some embodiments, the receptacle may transmit only the information extracted from the product container token. In certain other embodiments, the receptacle may transmit stored secondary information in addition to the information extracted from the product container token. The receptacle may first process the information extracted from the product container token to link to the appropriate stored secondary information to be transmitted. For example, the receptacle may process a barcode extracted from the product container to identify a product identification and/or manufacturer information, and use the identified information to select the appropriate secondary information using known matching and sorting techniques. Examples of stored secondary information may include, without limitation, information such as a URL, a unique identifier for the product container, a date and time stamp of purchase (or placement of product container in the receptacle), geographic location of purchase and/or receptacle, a date of manufacture of the product, information about the product contents, manufacturer information, vendor information, and the like. A user and/or a marketing entity may update the stored secondary information of the receptacle as well as the sorting rules.

In an embodiment, the user may couple the mobile device to the receptacle. As discussed previously, a user may use any known short range communication protocol, such as NFC, to couple the mobile device to the receptacle. For example, a mobile phone user may "tap" or otherwise position an NFC-enabled phone proximate to the communication tag (NFC tag) of the receptacle to commence transmission of extracted and/or stored secondary information, and receive 404 the transmitted information.

Use of the terms "coupled" and "connected", along with their derivatives, may be used. "Coupled" may be used to indicate that two or more elements are in either direct or indirect (possibly with other intervening elements between them) physical, communicative, or electrical contact with each other, and/or that the two or more elements co-operate or interact with each other. Coupling means establishing a paired communication link whereby the devices recognize each other and transmit information via NFC or a short range communication protocol.

Optionally, prior to the start of establishing the NFC connection, the mobile device may be in a "wake on NFC" mode. In this mode, the NFC interface of the mobile device may remain inactive until the NFC interface receives an NFC signal from another NFC interface. At the same time, NFC interface of the receptacle may be in a host mode. In the host mode, the NFC interface of the receptacle device may periodically emit NFC signals to seek out other nearby NFC interfaces. In certain other embodiments, the receptacle may continuously transmit information that a mobile device may detect and receive when it is within the communications range.

In an embodiment, where the product container and/or the product packaging label itself includes a communications tag, the mobile device may receive product information from the communications tag by tapping and/or positioning of a mobile device in close proximity. Optionally, the container and/or the product packaging label may continuously transmit pings or information that a mobile device may receive when it is within the communications range.

The above process, in some embodiments, may require exchange of authentication or encryption data (e.g., username, password, etc.) to ensure security of the transmission. In an embodiment, authentication information may be included in the token information. In addition, the requirement of very close proximity of NFC transmissions serves to further ensure security of the exchange of data. Because NFC transceivers must be within a short distance—often less than a few inches—of each other to function, it is extremely unlikely that another NFC-enabled devices would be capable of intercepting the communication of data between the two NFC transceivers.

In certain embodiments, the mobile device may include a software application to extract and process the transmitted information from the signal in step 405 (as discussed below). The software application may register itself with the mobile operating system allowing the application to monitor certain activities on the mobile operating system, and using the functionalities of the operating system. The software application may be launched automatically upon detecting the signal, or may be launched by a user of the mobile device. In other embodiments, the device may automatically prompt the user to confirm whether to launch the application. In certain embodiments, the mobile application is launched in the background and does not interfere with the already running foreground applications on the mobile device.

The user may acquire the application by downloading it from an application store or from a marketing entity such as a product supplier, manufacturer, vendor, or the like. In certain embodiments, the software application may be pre-installed on the mobile device. The software application may include virtually any application type which may run on any underlying operating system or platform. The software application may correspond to a local application which executes on the mobile device. Alternatively, the software application may represent a web application which executes on a remote application server. That is, the software application may include any application functionality which is accessed by the user over a network and experienced locally as application e.g., using a browser running on the mobile device. Techniques for executing such a web application, and related technology, are well known in the art and are therefore not described further in detail herein, except as may be helpful or necessary to understand operations of system. The software application may extract the token information and/or secondary information from the received signal using known techniques in the art. For example, the software application may use barcode reader modules, OCR reader modules, video image analysis, or other such modules on the mobile device and/or a network to extract the token information.

The software application may associate 206 various user information with the extracted information. User information may include, without limitation, demographic information, user preference information (provided by the user or based on past user interactions/actions), the geographic location of the user, date and/or time stamp, user-profile, and other such information relating to situations and/or events corresponding to the user. In some embodiments, the mobile application may allow the user to select one or more types of user information to be associated with the token information. In an embodiment, user preferences may be updated each time the software application is activated and/or after a fixed number of activations.

In an embodiment, a user may register the software application by providing information such as demographic information, location information and/or loyalty card or credit card information, which may enhance the functionality of the software application. Alternatively and/or additionally, the software application may have access to various information stored on and/or provided by the user to the mobile device and other applications of the mobile device. For example, the software application may use a location sensing module of the mobile device to obtain information relating to the geographic location of the user. The location sensing module may employ various location sensors of the mobile device such as global positioning system of the mobile device, Wi-Fi based positioning system (Wi-Fi triangulation), or micro-location techniques using tags, beacons, hotspots, transmitters, in order to receive information relating to the geographic location of a user. In certain other embodiments, the sensing module may determine the location of a user by using a network receiver application of the mobile device to identify the address and location of a connected Wi-Fi or a mobile communication network. Alternatively and/or additionally, the sensing module may determine the location of a user by accessing calendar entries stored in a calendar application (and/or travel organizer applications) of the mobile device, and correlating the calendar entries to the time.

In another embodiment, the software application may obtain information relating to the user-profile and/or demographic information by interfacing with one or more mobile applications that may include such information. Examples of such mobile applications may include, without limitation, social media applications such as Facebook, Twitter, and WhatsApp; cloud sourcing applications such as Yelp and Pinterest; the operating server of the mobile device for accessing information provided by the user (profile settings, language selections, etc.); communication applications (email, messaging, etc.), and other similar means. Example of user-profile and/or demographic information may include, without limitation, the user's primary language of communication (based on language settings, etc.), user's primary region of residence (based on social media information, etc.), user's occupation, and other such information.

The above types of user information and mechanisms for obtaining the user information are provided by way of example only and it will be understood to those skilled in the art that other types of user information and mechanisms are within the scope of this disclosure.

In step 207, the software application may analyze the information extracted from the transmitted signal (token information and/or secondary information) to identify and/or generate a message. For example, if the extracted information includes a product identification information, the software application may search an associated database store(s) and/or server(s) for other message information, including, without limitation, marketing entity instructions for steps to be performed upon identification of a product. Examples may include, for example, marketing entity instructions to display promotional information (such as videos) on the mobile device display, the receptacle display and/or the product container display. The instructions may also include message content and/or message templates for the mobile device to that the mobile device may identify and use. Additionally and/or optionally, the instructions may simply include rules (such as message content requirements, formats, message delivery address, etc.) for generation of a message at the mobile device itself. In an embodiment, a user of the mobile device may customize the instructions for identification/generation of the message.

A marketing entity such as a manufacturer, vendor, or other providers may continually update such information provided by the database store(s) and/or server(s). The software application may chose the appropriate database store(s) and/or server(s) using matching techniques known in the art or rules provided by the manufacturer, vendor, or other providers. For example, beverage manufacturer may specify the databases for retrieving information for different types of beverages it sells.

In an embodiment, the software application may obtain other product-related information as well from the database(s) or servers(s). Information such as product expiry date, product commercials, product ingredient list, product usage directions, customer support information, manufacturer identification, manufacturer information such as an associated URL, promotional information such as coupons, manufacturer format and preferred method for obtaining user information, and other such information may be obtained and used. Examples of product identification information may include, without limitation, product name, a unique ID, product type, brand name, etc. In some embodiments, the software application may use the retrieved information to generate and/or identify the message as per the defined rules.

In an embodiment, the generated message includes the product identification information and user identification information. In certain other embodiments, the generated message may also include geographical location of the user. In an embodiment, a user of the mobile device may customize the generated message.

As discussed above, the message generation and/or identification rules provided by a marketing entity also provide a message delivery address (destination). For example, the rules may instruct the mobile device to post the message on a social media platform associated with the identified user (mobile device user), such as Facebook, Twitter, Google+, etc. In another embodiment, the rules may instruct the mobile device to transmit the message to the marketing entity. In some embodiments, the mobile device may identify a message including a promotional video (or other content associated with the product) and may be instructed to play (deliver) the message on the mobile device display, the receptacle display, and/or the product packing label display.

In an embodiment, the software application may be instructed to generate a message to remind the user of the mobile device to buy the product at a future time. The future time may be calculated based on the time of receiving the transmitted information, product information, past user actions, and the like. For example, the transmitted signal may include product information that the product is a pack of 12 soda beverages and a time stamp of May 27. The software application may access information about past user actions which may indicate that the user buys same or similar product (12 packs of soda beverage) every 2 weeks. The software application may thus display on the mobile device display a message indicating the product identifying information and a reminder to buy 2 weeks after May 27. The software application may also use other mobile device applications such as calendar entries to calculate a future time for displaying the reminder message.

In another embodiment, the message may include a promotional message (such as a video), associated with the product, and retrieved by the software application, as discussed above. The mobile device may format the message to be compatible for display on the receptacle display and/or the product container display, and transmit the message to the receptacle and/or the product container. The message may be displayed on the display of the receptacle and/or the product container.

The marketing entity may use the personal information of the user to send to the user, without limitation, customized and targeted promotional information (such as coupons), brand or cross-brand advertisements, loyalty program information and rewards, photos, associated videos, feedback requests, and/or additional product information. In an embodiment, the marketing entity may send the above information to the user's mobile device. In certain other embodiments, the marketing entity may send the information to the receptacle and or the product packaging display directly (or via the mobile device).

The marketing entity may also use the personal information of the user to create a product mapping database associated with multiple users and/or receptacles. The product mapping database may include information such as products purchased by a user in a defined time period, products placed in a particular receptacle in a defined time period, products purchased by a user in a particular location, etc.

Figure 3A:
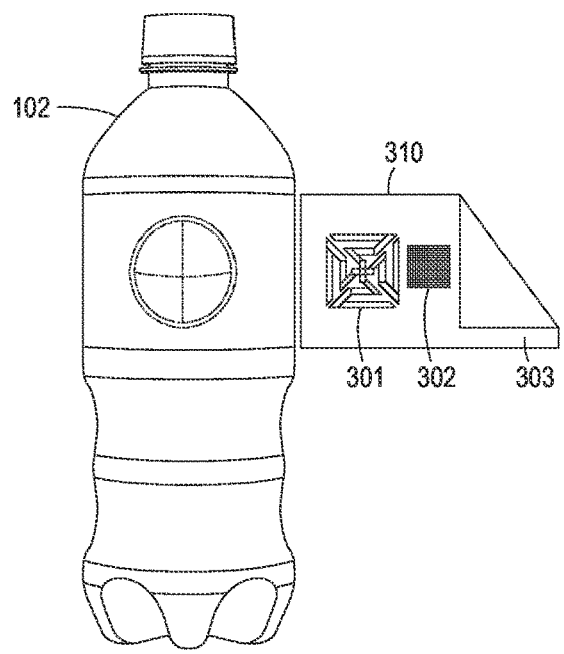
FIG. 3A illustrates an example product packaging label, according to an embodiment.
Figure 3B:
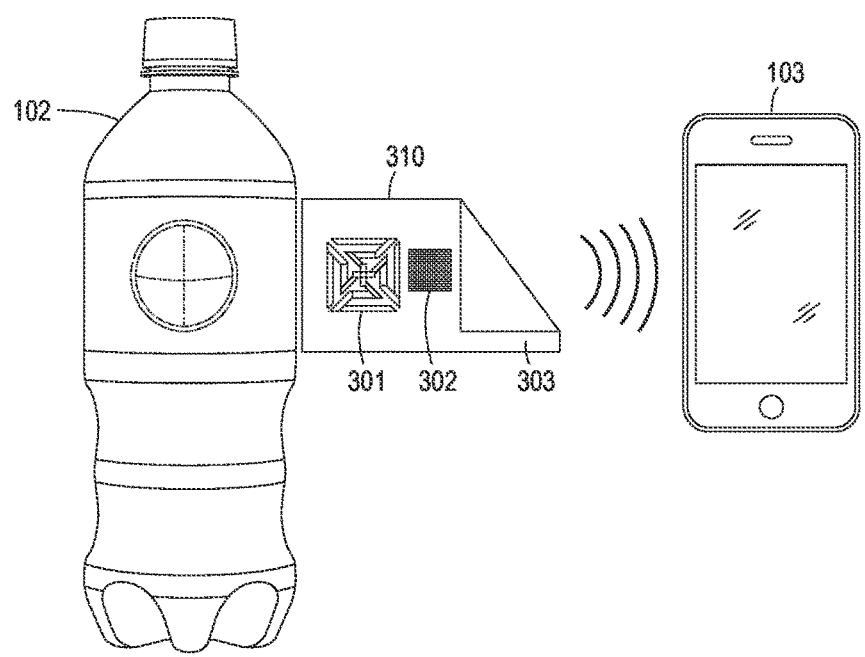
FIG. 3B illustrates an example embodiment of transmitting a signal from a product packaging label of FIG. 3A, according to an embodiment.
Figure 5:
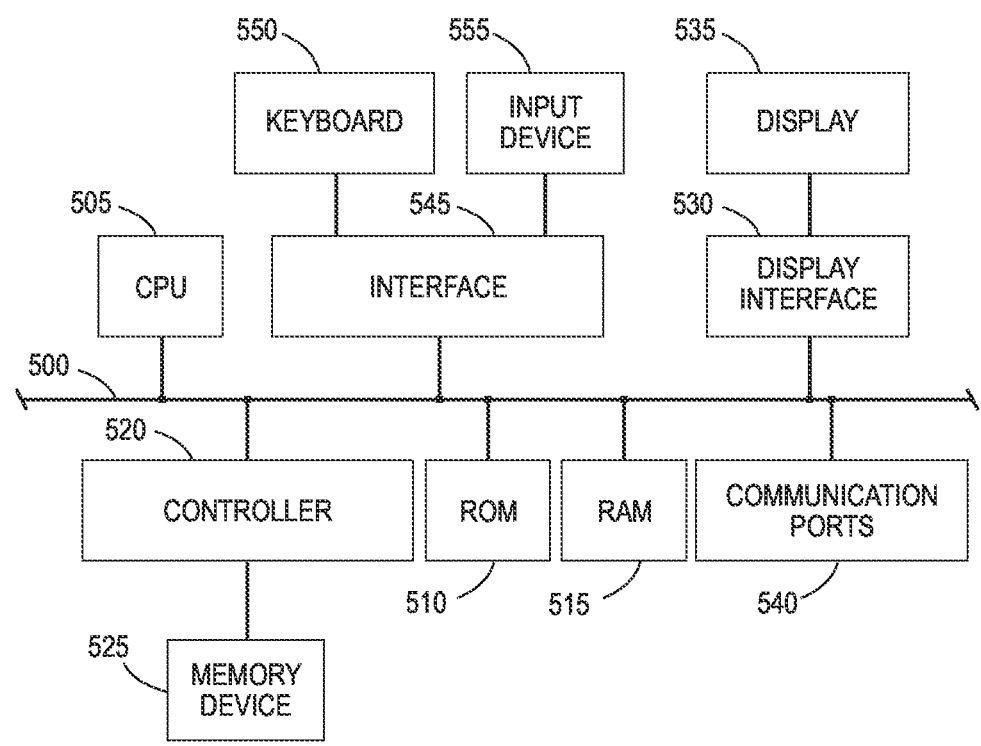
FIG. 5 illustrates a block diagram of example hardware that may be used to contain or implement program instructions according to an embodiment.

FIG. 5 depicts a block diagram of hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 3, is an example of a production device, computing device or processor as such terms are used within this disclosure. Read only memory (ROM) 510 and random access memory (RAM) 515 constitute examples of non-transitory computer-readable storage media.

A controller 520 interfaces with one or more optional non-transitory computer-readable storage media 525 to the system bus 500. These storage media 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 or otherwise presented by a user interface such as a display device or audio speaker in audio, visual, graphic or alphanumeric format. Communication with external devices, such as a receptacles and product containers, may occur using various communication ports 540. Examples of communication ports may include, without limitation, transmitter components, receiver components, antenna, NFC tags, Bluetooth tags, and other similar components. A communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

The invention claimed is:

1. A system for communicating a message in response to placement of a product within a receptacle, the system comprising:
   a receptacle configured to receive a packaged product, the receptacle comprising:
      a sensor configured to extract information from a token that is printed on the packaged product when the token is in a range of the sensor, and
      a wireless transmitter; and
   a mobile electronic device comprising a processor, a computer-readable memory, a wireless receiver that is operable to detect a signal emitted by the wireless transmitter of the receptacle, a transmitter, and programming instructions comprising an installed application that is configured to cause the processor to:
      detect the signal,
      analyze the signal and extract the information from the signal,
      retrieve user information for a user who is associated with the installed application,
      generate a message that corresponds to the extracted information, and
      cause the transmitter of the mobile electronic device to send the message via a wireless communication protocol,
   wherein:
      the receptacle comprises a beverage holder,
      the packaged product comprises a beverage container on which the token is applied, and
      the range of the sensor comprises an interior of the receptacle so that the sensor reads the token when the beverage container is placed in the beverage holder.

2. The system of claim 1, wherein the instructions to generate the message that corresponds to the extracted information comprise instructions to:
   identify a marketing entity that is associated with the packaged product; and
   generate the message for the marketing entity so that the message includes an identifier of the packaged product and the user information.

3. The system of claim 1, wherein:
   the mobile electronic device also comprises a geographic location sensor; and
   the instructions to generate the message also comprise instructions to cause the processor to include a geographic location information detected by the geographic location sensor for a time at which the electronic device detected the signal from the receptacle in the message.

4. The system of claim 1, wherein the instructions to generate the message that corresponds to the extracted information comprise instructions to:
   identify a social media application that is installed in the mobile electronic device; and generate the message as an instruction that will cause the social media application to post a communication to a social media account that is associated with the user, wherein the posted communication includes an identifier of the packaged product.

5. The system of claim 1, further comprising additional instructions that are configured to cause the processor of the mobile electronic device to:
receive, in response to the sent message, a marketing communication; and
present, on a display of the mobile electronic device, the marketing communication to the user.

6. The system of claim 5, wherein the marketing communication comprises a video that is associated with the packaged product.

7. The system of claim 1, wherein:
the receptacle also comprises a processor, a display, and a computer-readable memory;
the message comprises a media file that is playable by the processor and the display of the receptacle; and
the computer-readable memory of the receptacle comprises programming instructions that are configured to cause the processor and display of the receptacle to play the media file on the display upon receipt of the message from the mobile electronic device.

8. The system of claim 1, further comprising additional instructions that are configured to cause the processor of the mobile electronic device to:
identify an initial time at which the signal is detected;
use the initial time to calculate a future time at which to present a future purchase reminder for the packaged product to the user; and
at the future time, cause a display of the mobile electronic device to present the future purchase reminder to the user.

9. A method for communicating a message in response to placement of a product within a receptacle, the method comprising:
inserting a product package in a receptacle;
reading, using a sensor of the receptacle, information from a token printed on the product package;
transmitting, using a wireless transmitter of the receptacle, a signal comprising the extracted information;
receiving, the transmitted signal at a mobile electronic device;
analyzing, using a processor of the mobile electronic device, the received signal to extract the information;
retrieving, using the processor, user information for a user associated with the mobile electronic device;
generating, using the processor, a message that corresponds to the extracted information; and
transmitting, using a wireless transmitter of the mobile electronic device, the message,
wherein:
the receptacle comprises a beverage holder,
the product package comprises a beverage container on which the token is applied, and
the range of the sensor comprises an interior of the receptacle so that the sensor reads the token when the beverage container is placed in the beverage holder.

10. The method of claim 9, wherein generating the message that corresponds to the extracted information comprises:
identifying a marketing entity that is associated with the packaged product; and
generating the message for the marketing entity so that the message includes an identifier of the packaged product and the user information.

11. The method of claim 9, wherein:
the mobile electronic device also comprises a geographic location sensor; and
generating the message that corresponds to the extracted information further comprises including a geographic location information detected by the geographic location sensor for a time at which the electronic device detected the signal from the receptacle in the message.

12. The method of claim 9, wherein generating the message that corresponds to the extracted information further comprises:
identifying a social media application that is installed in the mobile electronic device; and
generating the message as an instruction that will cause the social media application to post a communication to a social media account that is associated with the user, wherein the posted communication includes an identifier of the packaged product.

13. The method of claim 9, further comprising, by the processor of the mobile device: receiving, in response to the sent message, a marketing communication; and
presenting, on a display of the mobile electronic device, the marketing communication to the user.

14. The method of claim 13, wherein the marketing communication comprises a video that is associated with the packaged product.

15. The method of claim 9, further comprising:
generating the message, wherein the message comprises a media file that is playable by a processor and a display of the receptacle; and
playing the media file, on the display of the receptacle, upon receipt of the message from the mobile electronic device.

16. The method of claim 9, further comprising, by the processor of the mobile device:
identifying an initial time at which the signal is detected;
using the initial time to calculate a future time at which to present a future purchase reminder for the packaged product to the user; and
at the future time, causing a display of the mobile electronic device to present the future purchase reminder to the user.

17. A system for communicating a message in response to placement of a product within a range of a sensor associated with an article, the system comprising:
an article configured to receive information from a packaged product, the article comprising:
a sensor configured to extract information from a token that is printed on the packaged product when the token is in a range of the sensor, and
a wireless transmitter; and
a mobile electronic device comprising a processor, a computer-readable memory, a wireless receiver that is operable to detect a signal emitted by the wireless transmitter of the article, a transmitter, and programming instructions comprising an installed application that is configured to cause the processor to:
detect the signal,
analyze the signal and extract the information from the signal,
retrieve user information for a user who is associated with the installed application,
generate a message that corresponds to the extracted information, and cause the transmitter of the mobile electronic device to send the message via a wireless communication protocol.

18. A method for communicating a message relating to a product package, the method comprising:
reading, using a sensor, information from a token printed on a product package;
transmitting, using a wireless transmitter associated with the sensor, a signal comprising the extracted information;
receiving, the transmitted signal at a mobile electronic device;
analyzing, using a processor of the mobile electronic device, the received signal to extract the information;
retrieving, using the processor, user information for a user associated with the mobile electronic device;
generating, using the processor, a message that corresponds to the extracted information; and
transmitting, using a wireless transmitter of the mobile electronic device, the message.

\* \* \* \* \*